US005235303A

United States Patent [19]

Xiao

[11] Patent Number: 5,235,303

[45] Date of Patent: Aug. 10, 1993

[54] MINIATURIZED UNIVERSAL ELECTROMAGNET CAPABLE OF OPERATION IN WIDE VOLTAGE RANGE

[76] Inventor: XinKai Xiao, 27, Miao-Xiang Lane, Fuzhou 350001, China

[21] Appl. No.: 729,127

[22] Filed: Jul. 12, 1991

[30] Foreign Application Priority Data

Jul. 14, 1990 [CN] China ........................ CN90104736.8

[51] Int. Cl.[5] ........................................ H01M 67/02

[52] U.S. Cl. ........................................ 335/132

[58] Field of Search ........................ 335/78-86, 335/131-133, 202

[56] References Cited

U.S. PATENT DOCUMENTS 4,616,203 10/1986 Kakizoe et al. ..................... 335/201

4,893,102 1/1990 Bauer ................................ 335/132

*Primary Examiner*—Lincoln Donovan

*Attorney, Agent, or Firm*—Finnegan, Henderson, Farabow, Garrett & Dunner

[57] ABSTRACT

The present invention relates to a kind of electromagnet for applications requiring traction, braking, vibration, electromagnetic valve and contactor operations. The electromagnet according to the present invention has new characteristics of temperature rise. A T-shaped solenoidal structure without a heat dissipating window is provided for the body of the electromagnet. Only under high magnetic flux-density close to saturation can the electromagnet sustain holding. Current limiting switching circuits are also provided. The starting current-density of the coil is very high. The starting ampere-turns is higher than the value adopted in conventional designs, and the holding ampere-turns are very low. A normal fuse tube can be reliably adopted for overheat protection. The electromagnet has distinct advantages of excellent working performance (capable of frequent operation and continuous holding); high protection grade; high reliability and high efficiency; long life; very light weight and small size; greatly conserving both copper and iron, and greatly saving cost. In another aspect, a new generation of miniaturized contactors not having a metal seat and capable of switching higher voltages and/or larger currents may be developed accordingly.

17 Claims, 3 Drawing Sheets

MINIATURIZED UNIVERSAL ELECTROMAGNET CAPABLE OF OPERATION IN WIDE VOLTAGE RANGE

BACKGROUND OF THE INVENTION

The present invention relates to a miniaturized universal electromagnet capable of operation in wide voltage range. After it is energized, its moving core can move in one direction. After the electromagnet is deenergized, potential energy of the moving core (i.e., gravity, spring force or elastic deformation during the movement of the moving core after the electromagnet is energized returns the moving core to its initial position. The electromagnet is particularly applicable as an electromagnet for applications requiring traction, braking, vibration, electromagnetic valve and contactor operations.

A conventional electromagnet, whether A.C. or D.C., consists of a static core, a moving core, a coil package, a demagnetizing shim or gap and an electric control component. Due to many limiting factors the magnitude of working magnetic flux-density of an electromagnet is generally restricted to a low range usually 7 kilogauss or less than 7 kilogauss. The requirements for working duty and coil temperature rise require a large amount of coil copper, a low utilization coefficient of copper and iron materials, a low weight economy index (work done by electromagnet/weight of electromagnet, unit: $m^2/s^2$), short mechanical life and low working reliability. Taking the $MZD_1$-200 brake electromagnet as an example, its weight is about 16 kg, its mechanical life is below 600 thousands operating cycles. Further, a conventional D.C. brake electromagnet of the same capacity is even heavier.

A short stroke direct acting D.C. brake electromagnet with U-shaped construction is known. When the core of this type of electromagnet is made of low carbon steel with a weight about 5.5 kg, its working magnetic flux-density reaches 10–12 kilogauss for the same capacity as $MZD_1$-200. When its core is made of electric steel material having high magnetic flux-density, its working magnetic flux-density reaches 15–16 kilogauss.

A shift-switching control circuit having an A.C. source, a current-limiting capacitor and bridge rectifier has been adopted for the electromagnet (see FIG. 1). One terminal of the shift-switch SW is connected to one pole of operating source Uac, the other terminal to an A.C. side of the bridge rectifier Z. A current-liminting capacitor link X is connected in parallel with switch SW. Circuit X consists of a capacitor $C_1$, a resistor $R_1$ and a resistor $R_2$, $R_1$ being in parallel with $C_1$, and in series with $R_2$. The other A.C. side of Z is connected to the other pole of the source Uac. The coil W is connected to the D.C. sides of Z. If quick releasing of the electromagnet after deenergization is required, a quick release contact FK, whose on-off operation is synchronized with the operating source, may be added in one terminal of W. The contact FK is in series with W. The two terminals (nodes a and b in FIG. 1) of FK are connected to a resistor $R_3$. When the electromagnet is energized and its closing movement starts, the contact at SW is in an "on" state and enables the full voltage to be applied onto the coil W through bridge rectifier Z. SW breaks just before the electromagnet accomplishes the closing movement, and then circuit X is put into a working state thus reducing the working voltage of coil W to a small fraction of that in the starting state while still being sufficient to sustain holding. In all existing designs, the lower limit of the closing voltage is taken and adjusted according to the value corresponding to about 0.80 of the rated voltage of the electromagnet in a hot state. Further, according to existing techniques, the starting current-density in the coil cannot significantly exceed 25 A/mm$^2$.

The lower limit of the closing voltage of the conventional electromagnet is generally over 0.80–0.85 of the rated voltage. If this lower limit is exceeded, damaging effects to performance and service life of the electromagnet and the coil will result.

In conventional D.C. electromagnets, the attraction-counteraction matching characteristic is generally considered theoretically better and easier to affect an optimized matching. In fact, this is not the case. In practice, under the same condition of main contact systems, the mechanical life of a D.C. electromagnet is obviously lower than that of an A.C. one in both domestic as well as oversea products. For example, the mechanical life of a new series of D.C. contactor is only one half of that of a new series of A.C. contactor of the same capacity. When a contactor is closing, a lot of kinetic energy is released in the form of impact of the cores. This impact energy increases rapidly as a function of contactor capacity. As a result, the mechanical life of a large-capacity device is only one half or even less than that of a small capacity one. Thus, any direct-acting type contactor over 60 A has a rigid and ventilated metal seat to contain the electromagnet which is fitted in the seat through buffered coupling parts. The mounting holes of contactor can only be located on the seat.

A conventional T-shaped electromagnet (not used for small-capacity devices) usually has only one contact surface for closing on the T-shaped moving core, in order to reduce detrimental closing impact. Due to the inherent attracting characteristic of the T-shaped electro-magnet, no contactor over 40 A is used with the T-shaped solenoidal electromagnet.

Some of the existing A.C. electromagnets may have their static energy saving rate over 96% when energy saving and noiseless running measure are implemented. However, static power consumption of a D.C. traction electromagnet or brake electromagnet consuming static power, equally effective reduction measures are not available. Large and medium conventional capacity brake electromagnets (used in driving brakes of braking torque over 60 kg.m) are now obsolete and substituted by hydraulic products because of their unadaptability for mass production. However, electromagnetic-hydraulic or electrohydraulic brakes are not likely to be used extensively owing to their complex structures, high cost, etc.

SUMMARY OF THE INVENTION

The aim of the present invention is to provide an electromagnet which possesses the superior characteristics over existing electromagnets of the same capacity such as: higher efficiency, considerable reduction of both dimensions and weight, miniaturization of electromagnets, as well as being capable of operation in a wide voltage range.

Another aim of the present invention is to offer a new type of contactor with a capacity over 60 A that does not require the conventional metal seat containing the electromagnet. This contactor has higher performance, simple structure, and lighter weight.

A further aim of the present invention is to realize overheat protection of electromagnets by using fuses.

The present invention is achieved by raising the working magnetic flux-density of the core, raising the starting current-density of the coil based on a new mechanism of coil temperature rise, selecting a T-shaped solenoidal structure for electromagnet proper and selecting several control circuits have closing switching and current-limiting links (note: in the case of a vibrating electromagnet the current-limit value is zero).

The T-shaped solenoidal electromagnet, according to the present invention is provided with two closing contact surfaces, i.e. there exists closing contact surfaces on the horizontal and vertical portions of the T-shaped moving core. The electromagnet is made into a totally enclosed device without a heat dissipating window. The working magnetic flux-density is close to the saturated value of the core materials. The traction electromagnets, the electromagnets in contactors, the electromagnetic valves and vibrating electromagnets made of low carbon steel or hot-rolled silicon steel sheet (saturated magnetic flux-density of the two are close) should have the magnetic flux-density in their magnet poles in the range of B=10–14 kilogauss so as to sustain holding. With respect to the brake electromagnets, the value of B should reach 12.1–14 kilogauss. As for the traction electromagnets, the electromagnets in contactors and in electromagnetic valves, and the vibrating electromagnets made of soft magnetic materials whose saturated magnetic flux-density is 19–21 kilogauss, this value of B should be in the range of 15–18.5 kilogauss. For brake electromagnets, however, B should be in the range of 16.6–18.5 kilogauss. The higher value of B corresponds to devices with lower magnetic leakage, and lower value of B corresponds to those devices with relatively higher magnetic leakage. In excitation, the steady state starting ampere-turns for coil W in the cold state (e.g., 20° C.) is 1.5–5 times of the minimum value necessary to start the electromagnet and/or enable it to accomplish closing movement. Thus, a quick closing over a wide range of operating voltages can be achieved (e.g., it is possible to develop the devices whose operating voltage can be either 220 v or 380 v and may be further extended to 110 v–440 v as required).

When the operating voltage is doubled or increased further, a corresponding step switch or an adjustment knob is provided in the control circuit, so as to keep holding current relatively steady. There are three reasons for doing so:

1. An electromagnet whose working magnetic flux-density close to saturation has very limited surplus attractive force, so that damage to the device due to excessive attractive force under doubled forced excitation is unlikely.

2. Under doubled forced excitation, combined with the electric control mode of closing switching, the starting time of the electromagnet after being energized is shortened and the heat loss Q of the electromagnet per acting cycle, $Q={}_0\int^{t_1} i^2(t)Rdt$, is reduced. The higher the number of times forced excitation is, the shorter $t_1$ (time of accomplishing the closing movement) will be. However, the value of Q will not necessarily increase at the same rate as the number of times of forced excitation. When the loading condition remains unchanged, there exists a bathtub curve functional relationship between coil temperature rise and excitation voltage. In an initial section of the curve, there exists a characteristic of negative temperature rise. When excitation voltage is rising gradually from the critical starting value, coil temperature rise on the contrary will drop, i.e. at the downside section of the bathtub curve, the characteristic of "negative temperature rise" will be displayed. The next section is a steady region, where quick increase of excitation voltage has no obvious effect upon coil temperature-rise. In the final section, along with the rising of excitation voltage, the starting time of the electromagnet approaches zero, and a rising characteristic of coil temperature-rise reappears.

3. Provided that the starting current-density of the coil is properly selected, the coil will not burn out even at the upper limit of operating voltage. In the cold state, the steady state maximum value of starting current-density in the coil is selected with reference to $J_q$=30–150 A/mm$^2$. A smaller value of $J_q$ is suitable for high frequency operation, while a large value of $J_q$ is appropriate for low frequency operation.

DESCRIPTION OF THE PREFERRED EMBODIMENT

Figure 8:
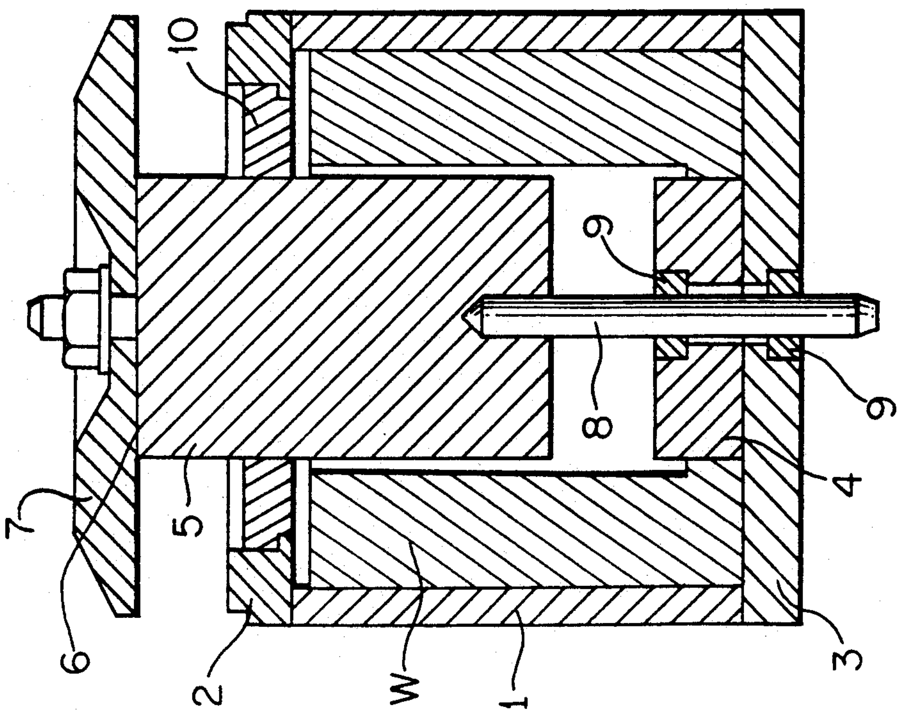
FIG. 8, the structure of the electromagnet proper of the present invention.

FIG. 8 shows the structure of the electromagnet in accordance with a preferred embodiment of the present invention, which is a totally-enclosed, T-shaped, cylindrical solenoidal electromagnet with all the core components made of solid steel. As seen in FIG. 8, the electromagnet consists of three parts, a coil W, a static core and a moving core. The static core mainly comprises a base 3, an upper pole 2, a stop pedestal 4, an outer yoke 1, an upper guiding bush 10 and a lower guiding bush 9; the moving core comprises a lower guiding rod 8, a moving pole 5, a demagnetizing shim 6 and a disc-shaped upper armature 7. The upper armature 7 and the moving pole 5 form a T-shaped construction. The outer yoke 1 is a tubular housing without a heat dissipating window. The coil W is inlaid inside the outer yoke 1. The upper pole 2 and base 3 are fitted together with outer yoke 1 by fasteners to form an integral unit. The stop pedestal 4 is fitted on the base 3. Of course, 1, 2, 3 and 4 or 1 and 2 may form an integral unit. The demagnetizing shim 6 is cut from brass sheet and inserted between the upper armature 7 and the moving pole 5.

The lower guiding rod 8 is tightly inserted at the lower end of the moving pole 5. The thrust rod of a traction electromagnet, or brake electromagnet or vibrating electromagnet can be used simultaneously as the lower guiding rod 8. There may be one or a pair of lower guiding bushes 9 fitted on the base 3 where the lower guiding rod 8 penetrates therethrough. The upper guiding bush 10 is inlaid inside the upper pole 2. By means of the upper and lower guiding bushes, the moving core can move smoothly. The upper guiding bush 10 may be made of oil-containing nylon, and the lower guiding bush 9 may be a copper based oil-containing sleeve or an oil-containing nylon sleeve. For the moving pole 5 and stop pedestal 4, as well as the upper armature 7 and upper pole 2, all have closing contact surfaces.

As for the contactor, besides T-shaped cylindrical solenoidal electromagnet made of solid steel mentioned above, a T-shaped solenoidal electromagnet of laminated silicon sheet steel may be implemented. An upper guiding bush 10 with a rectangular shaped opening is inlaid on the static core. The lower guiding rod 8 may be a slender brass rod, cold-pressed onto a small square steel, which is inlaid in the middle of the bottom of the moving pole 5. There is a small round hole drilled in the middle of the stop pedestal 4, for accommodating the sliding motion of the lower guiding rod 8.

Figure 11:
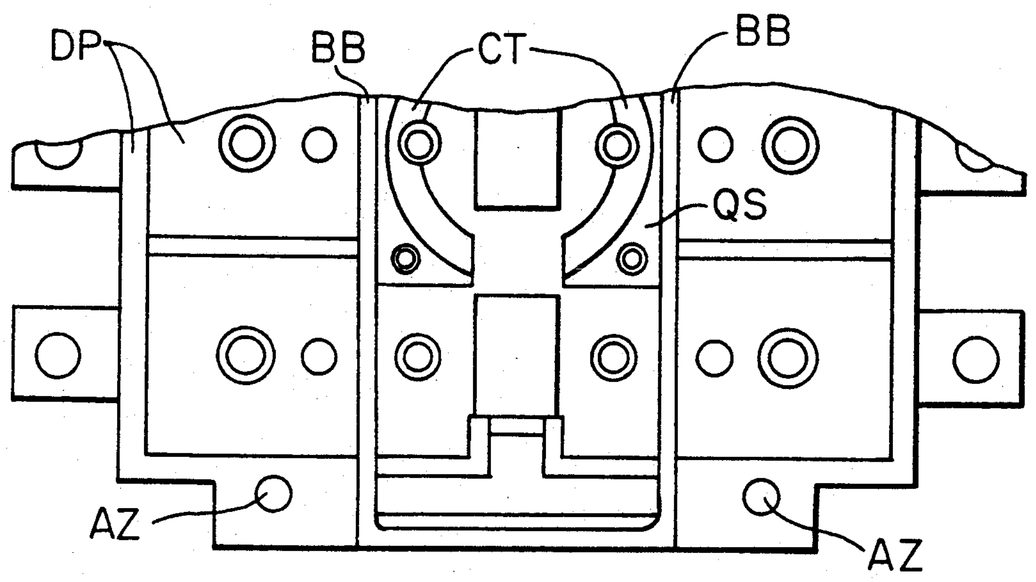
FIG. 11, the partial bottom view of the insulation base plate DP of the contactor shown in FIG. 10 of this invention.
Figure 10:
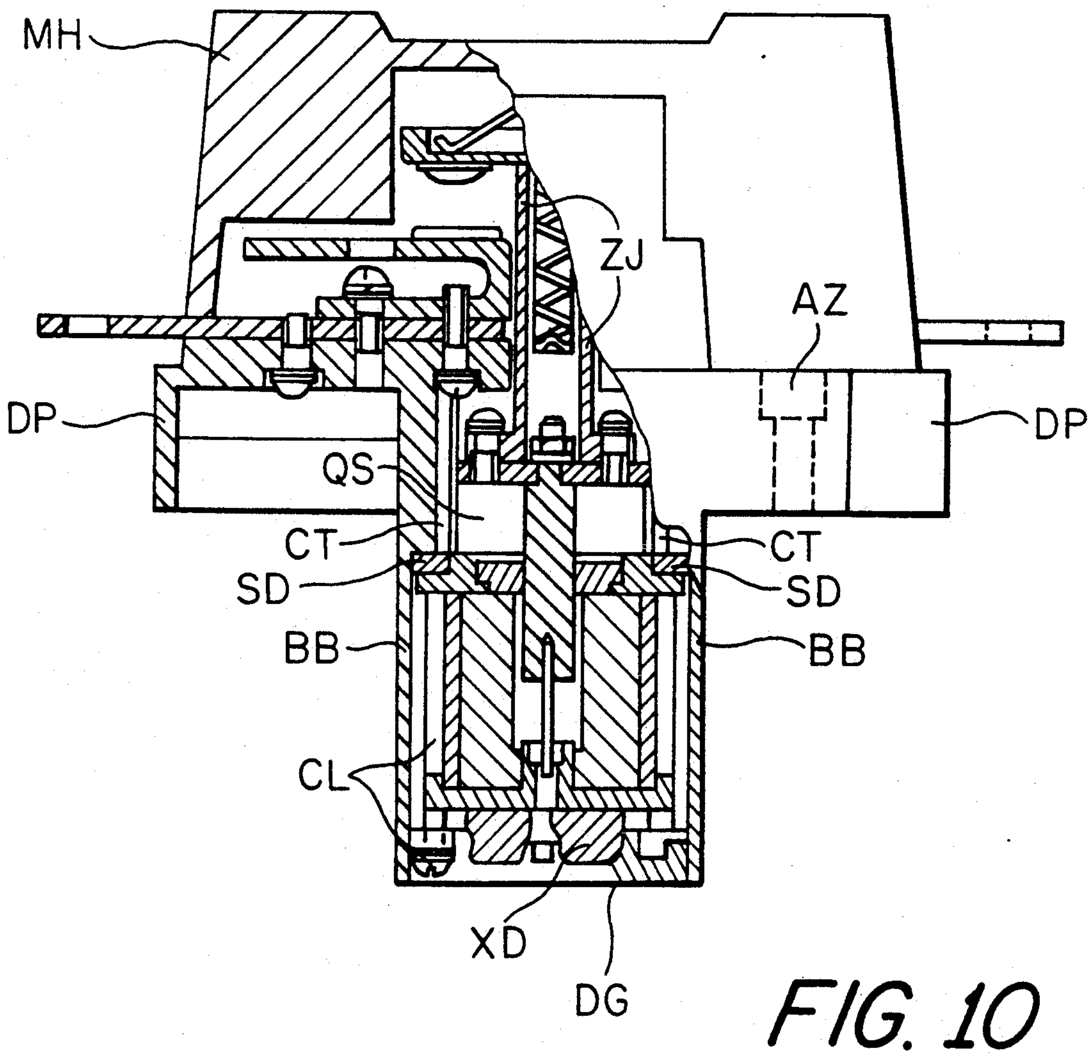
FIG. 10, the front view of the contaactor with no metal seat of embodiment 2 of this invention.

As the surplus attractive force of the electromagnet of the present invention is rather limited, highly destructive impacts due to excessive attractive force are not likely to occur under double forced excitation, so the direct-acting type of contactor using the electromagnet of the present invention needs no metal seat for containing and installing the electromagnet and for mounting the contactor itself. As shown in FIGS. 10 and 11, the electromagnet is fitted under the insulation base plate DP of the static contact system through rubber or spring buffer parts, and the mounting holes AZ of the contactor are located on DP.

Figure 1:
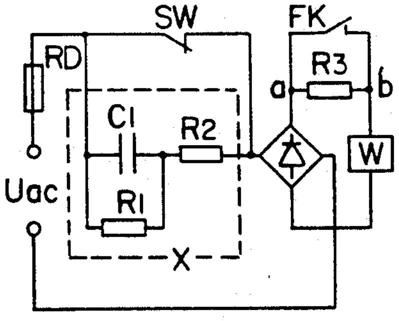
FIG. 1, an A.C. control circuit of shift-switching capacitor current-limit.

In addition to FIG. 1, the present invention may adopt several models of control circuits as follows. A fusible cutout RD is connected to the input terminal of each of control circuit, which is also added when FIG. 1 is adopted. The nominal current value of the fuse tube of RD is selected within 1/6–1/2.75 of the maximum starting current of the electromagnet. Since starting current is at least eight times larger than holding current, and the time for starting and moving lasts only several tens to several hundreds of milliseconds, RD will not be burnt out during normal closing movements. During holding, the current is very small and will not overheat the coil. In case the electromagnet cannot accomplish closing movement and the starting current cannot be switched off in time, RD will then be burnt out rapidly to protect the coil from overheating.

Figure 2:
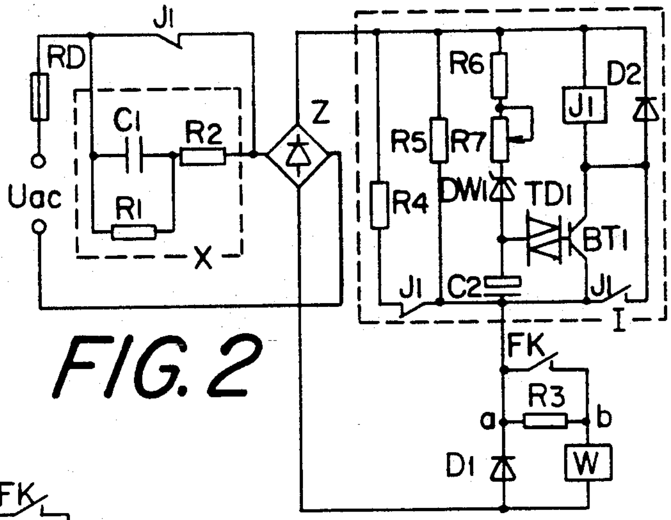
FIG. 2, an A.C. control circuit of current integral delayed switching capacitor current-limiting.

FIG. 2 shows an A.C. control circuit including a current integral delayed switch and current limiting capacitor. It uses a current integral time delay link I connected in series with a coil connecting wire to control closing switching. The input terminal of I is connected to a node comprising connections with the resistors $R_4$, $R_5$, $R_6$, one end of the coil of a miniature relay $J_1$, and the negative terminal of a diode $D_2$. After $R_6$, an adjustable resistor $R_7$, a Zener diode $DW_1$ and the positive terminal of an integrating capacitor $C_2$ are successively connected in series. In addition, the positive terminal of $C_2$ is connected to a triggering diode $TD_1$, whose another terminal is connected to the base of a transistor $BT_1$. Another terminal of the coil of $J_1$, the collector of $BT_1$, the positive terminal of $D_2$ and a normally open contact of $J_1$ are connected into a node; the other terminals of $R_4$ and $R_5$ are connected by a normally closed contact of $J_1$. The common terminal of this pair of normally opened and closed contacts of $J_1$, the negative terminal of $C_2$ and the emitter of $BT_1$ are connected into a node which is the output terminal of I. Another normally closed contact of $J_1$ is used to replace the shift-switch SW in FIG. 1. A diode $D_1$ is connected in a reversed-parallel manner with the coil W through a quick-release contact FK, which is connected in parallel with a resistor $R_3$. Alternatively, $BT_1$ in FIG. 2 may be a thyristor. The other connections are the same as in FIG. 1. If a quick-releasing function is not required, nodes a and b may be shorted in FIG. 2. Similarly, such shorting may be performed in other circuits of the present invention. If some delayed-releasing characteristic (several hundreds of milli-seconds to several seconds) is required, the average value of the holding current may be increased properly.

$R_4$ in FIG. 2 is a sampling resistor. During starting of electromagnet after energizing, the voltage drop on $R_4$ should correspond to the working voltage of the coil of $J_1$. By adjusting the value of $R_7$ the switching delay time may be changed. $R_5$ is a balance resistor which ensures $J_1$ is maintained in the holding state reliably and protects the coil of $J_1$ from burning out due to overcurrent while the electromagnet is kept in the holding state.

Figure 3:
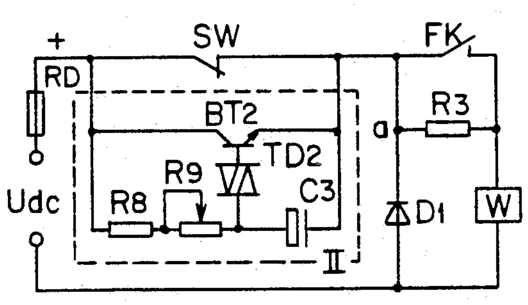
FIG. 3, a D.C. control circuit of shift-switching and chopped current-limiting.

FIG. 3 shows a D.C. shift-switching and chopped current-limiting control circuit. It is applicable to D.C. operation or rectified operation. In this circuit, a transistor chopped current-limiting link II, which is connected in series with the electromagnet coil, is used to limit the holding current of a D.C. electromagnet. It can greatly reduce the power consumption of a D.C. electromagnet in the holding state (the power consumption of a D.C. electromagnet with FIG. 3 will be close to that of an A.C. one of the same capacity by adopting some noiseless running measures). The positive terminal of II is connected to a resistor $R_8$ and the collector of a high voltage transistor $BT_2$. After $R_8$, an adjustable resistor $R_9$ and a capacitor $C_3$ are connected in series successively. The positive terminal of $C_3$ is in addition connected to a triggering diode $TD_2$, the other terminal of which is connected to the base of $BT_2$. The emitter of $BT_2$ and the negative terminal of $C_3$ are connected together to form the negative terminal of link II. II is connected in parallel with shift-switch SW. Similar to FIG. 2, after SW and II, the diode $D_1$, the quick-releasing contact FK, the coil W and resistor $R_3$ are connected as that in FIG. 2. By adjusting $R_9$, the holding current (average value) in the coil may be regulated.

Figure 4:
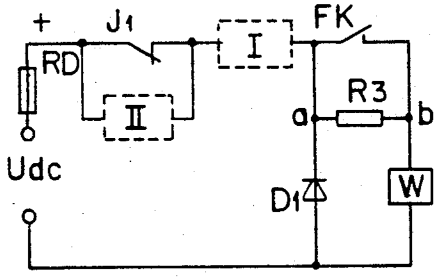
FIG. 4, a D.C. control circuit of time delay switching and chopped current-limiting.

FIG. 4 shows a D.C. time delay switching and chopped current limitation control circuit which is developed from FIG. 3 by adding it to a current integral time delay link I and replacing the shift-switch SW with a normally closed contact of $J_1$ of link I. If a bridge rectifier Z is added to the input terminals of the source in FIG. 3 and 4, or a diode is connected in series with the positive terminal of the D.C. source, it is possible to realize the universal operation (with either an A.C. source or D.C. source). Of course, with half-wave rectifying, the lower limit of the operationg voltage of the A.C. source is lower than that of the D.C. source.

By adopting the chopped current-limited link II, not only may universal operation be realized, but also in view of probability, the failure rate of the chopped current-limited link II is lower than that of capacitor current-limiting link X.

Figure 5:
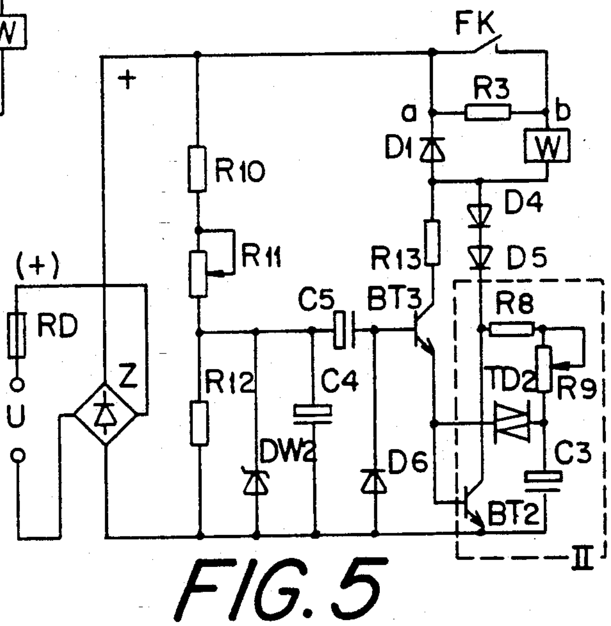
FIG. 5, a contactless control circuit of chopped current-limiting and time delayed switching.

FIG. 5 shows a contactless control circuit of chopped current-limiting and time delayed switching. It uses a differential link composed of a resistor $R_{10}$, an adjustable resistor $R_{11}$ and a differential capacitor $C_5$ to turn on transistors $BT_3$ and $BT_2$ during the closing movement of the electromagnet after being energized, and coil W can get forced excitation. By adjusting the value of $R_{11}$, the delay time of the delayed switching (i.e., the time of forced excitation) may be regulated. In order to realize universal operation, a bridge rectifier Z may be connected to the input of the operating source, or a diode may be connected in series to the positive terminal of the input of the source. $R_{10}$ is connected to the positive terminal of the rectified or D.C. operating source and terminal "a" of the quick-release contact FK. The connections of $R_3$, "a" and "b" terminals of FK with coil W and diode $D_1$ are the same as shown in FIG. 1 to FIG. 4. After $R_{10}$, $R_{11}$ and a resistor $R_{12}$ are connected in series. The connecting wire of $R_{11}$ and $R_{12}$, the negative terminal of a Zener diode $DW_2$, the positive terminal of a stabilizing capacitor $C_4$ and the positive terminal of $C_5$ are connected to a node. The negative terminal of $C_5$, the negative terminal of a diode $D_6$ and the base of a high voltage transistor $BT_3$ are connected to a node. The collector of $BT_3$ is connected to a resistor $R_{13}$. The emitter of $BT_3$ is connected to the base of $BT_2$. The other terminal of $R_{13}$, the lower terminal of coil W, the positive terminals of diodes $D_4$ and $D_1$ are connected into a node. $D_4$ and another diode $D_5$, after being connected in series in the same direction, are then connected to the collector of $BT_2$ (i.e., the positive terminal of chopped current-limited link II). The other terminal of $R_{12}$, the positive side of $DW_2$ the negative terminal of $C_4$, the positive terminal of $D_6$, the emitter of $BT_2$ (i.e., the negative terminal of link II) and the negative terminal of rectified (or D.C.) operating source are connected to a node.

As a model of contactless control, a Hall shift sensing element may also be used to realize the control of shift-switching, and the transistor chopped current-limiting link II can also be used to provide holding current after switching.

If the current-limit value of the current-limiting link is zero, i.e., only the starting current but not the holding current is to be provided, the electromagnet of the present invention may be used as a low frequency vibrating electromagnet, whose vibration amplitude is large and can reach 2–12 mm easily. If a rectifier element is added in the operating source, it may also realize universal operation. The vibration model may be divided into two categories, i.e., self-vibrating and controlled-vibrating.

Figure 6:
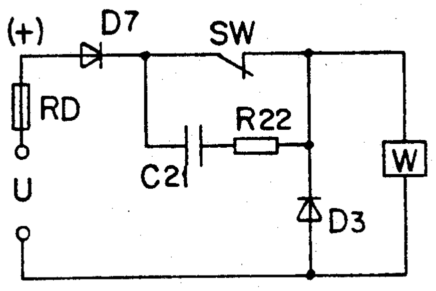
FIG. 6, a self-vibrating control circuit of shift-switching.

FIG. 6 shows a self-vibrating shift-switching control circuit. A diode $D_7$ (half wave rectifier) or a bridge rectifier Z is connected to the input of the operating source. The positive pole of the D.C. (or rectified) operating source is connected with the shift-switch SW in advance, and then coil W is connected in series after SW and then to the negative pole of the operating source. Diode $D_3$ is connected in reversed-parallel with W. A resistance-capacitance absorption link is connected in parallel with SW; a capacitor $C_{21}$ and a resistor $R_{22}$ after series connection are connected in parallel with SW, and $C_{21}$ and $R_{22}$ can eliminate switching arc in SW. The existence of $D_3$ is also useful for elimination of switching arc in SW and enables the moving core to continue its closing movement for a short duration after SW is switched off.

Figure 7:
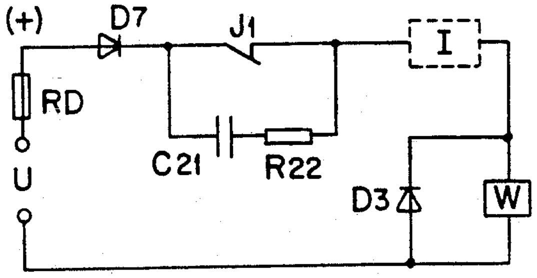
FIG. 7, a self-vibrating control circuit of current integral delayed switching.

FIG. 7 shows a self-vibrating current integral delayed switching control circuit. It differs from that shown in FIG. 6 in that the current integral delayed switching link I is adopted to control the closing switching of vibrating electromagnet, and a normally closed contact of $J_1$ in link I is used to replace the shift-switch SW with I being connected in series in one connecting wire of coil W.

By utilizing a multivibrator with both frequency and turn-on time adjustable to carry out continuous on-off control of the electromagnet of the present invention, a controlled vibration is possible to realize, including utilization of a second-impulse signal of a quartz clock or a time-base integrated circuit containing a quartz resonator, so that the electromagnet may obtain one or more highly stable vibrating frequencies.

The vibrating electromagnet of the present invention is of large vibration amplitude, high efficiency and with effects better than conventional binwall vibrating electromagnets when used as vibrator to walls of bins for sticky material (such as a cement mixture).

The present invention is further explained with reference to the following embodiments as follows.

Figure 9:
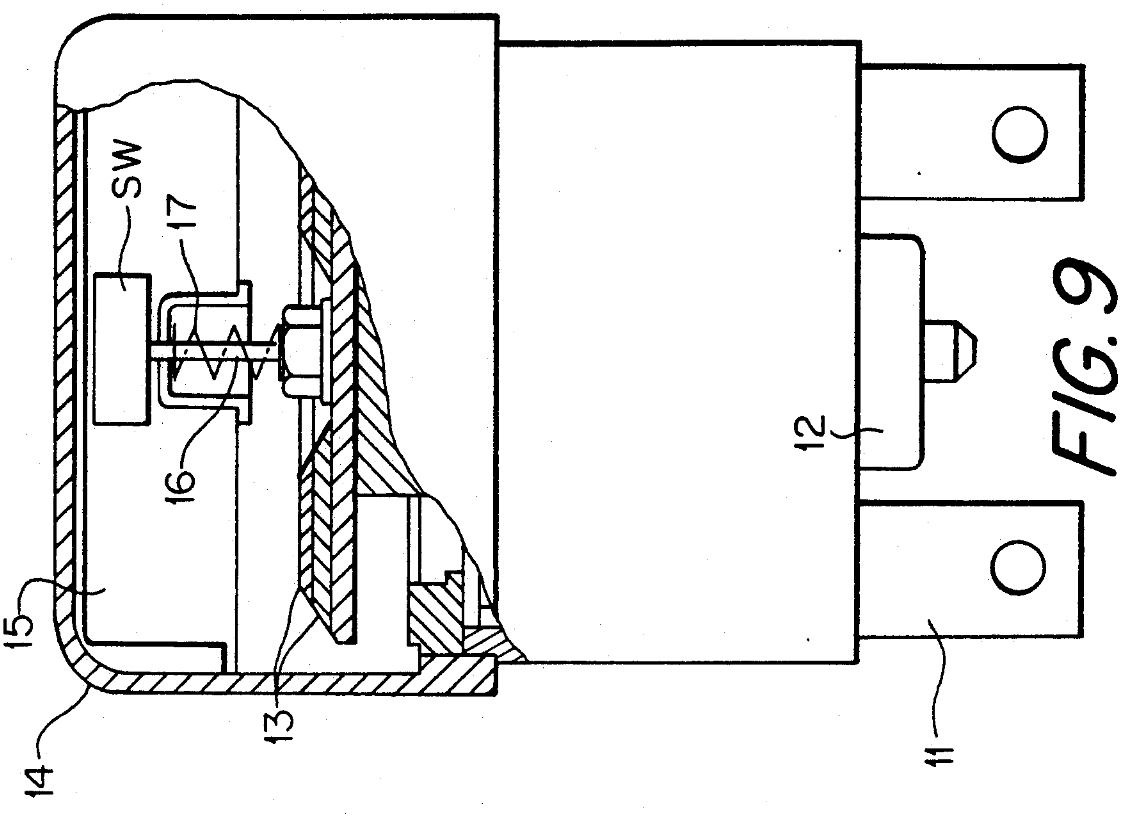
FIG. 9, an integral structure of the electromagnet of embodiment 1 of this invention.

In accordance with a second embodiment, with the addition of a set of mounting legs 11 etc. on the electromagnet shown in FIG. 8, the electromagnet may be used as a brake electromagnet, a traction electromagnet or a vibrating electromagnet (see FIG. 9). The shape of mounting legs and position of mounting holes should be determined by actual requirements. Under the bottom of base 3, an elastic sealing pad 12 may be placed or glued on so as to raise its protecting performance. On the upper armature 7, one or more auxiliary armatures may be placed. As the load varies, the output force of the electromagnet may be decreased to some extent by removing the auxiliary armature 13, so that the whole system of the device can work more smoothly and steadily. If protection grade is required, a plastic or metal hood 14 may be added which is covered on the electromagnet.

When a shift-switching control circuit with contacts is adopted in the electromagnet, the shift-switch SW, and even the whole control circuit device 15, may be fixed above the upper pole 2 with supporting pieces. The shift-switch SW is controlled by a slender rod 16 stretching from the upper armature.

When the electromagnet is used as a brake electromagnet, one or a set of restoring springs 17 may be added to eliminate the air gap and to prevent the thrust rod (i.e., the lower guiding rod 8) from deforming upon impact. It is preferred to adopt a lateral hung mounting mode for the brake electromagnet, which is mounted on one side of the main support of the brake. The thrust rod 8 directly butts against the main spring of the brake. This mounting mode is also applicable to brakes of large and medium capacities ($M \geqq 60$ kg.m).

In designing the electromagnets according to present invention, the holding magnetic flux-density of the poles made of low carbon steel is set at $B = 12.5$–$13$ kilogauss. The area of the upper pole 2 is $S_1 = 12.5\ F/B_2$, where F is the maximum designed attraction force. The area of the stop pedestal 4 is $S_2 = S_1 + \Delta S_1 + \Delta S_2$, where $\Delta S_1$ is the area occupied by the thrust rod, calculated from $\Delta S_1 = (0.125\text{–}0.1)\ F$, and $\Delta S_2$ is the area occupied by the lower guiding bush 9 with a wall thickness of 2–4 mm. The allowable range for the working stroke is $\delta=6\sim12$ mm and the reserve stroke is 2-5 times of that of present electromagnets (the reserve stroke corresponds to the quantity of wear and tear of the brake shoes. At the lower limit of the stroke the reserve stroke is maximum; at the upper limit of the stroke while under rated load, the reserve stroke is zero. Compared with type MZZ5-250, a short stroke direct acting type of brake electromagnet, the lower limit of its stroke is 3 mm, the upper limit is 4.5 mm, the reserve stroke is 1.5 mm and the rated attraction force is 250 kgf. With the electromagnet of the present invention, $\delta$ is taken as 6-12 mm). In order to meet the requirement of devices for frequent operation, the maximum steady starting current-density (cold state) in coil W is taken as $J_q=40$-$60$ A/mm$^2$. The attracting ampere-turns per millimeter of working stroke is taken as $IN_2=19$-$00$-$2000$ (AT), the lower value corresponding to higher spring rigidity and a larger stroke. The maximum starting ampere-turns of the coil in the cold state is calculated according to $IN_q=IN_z\,(1.5\text{-}5)\delta$. For example, for F=800 kgf, with the core made of steel grade 8-15 or $A_3$ low carbon steel, $S_1=59.2$-$64$ cm$^2$ $\Delta S_1=78.5$ mm$^2$, $\Delta S_1+\Delta S_2=2$ cm$^2$, $S_2=61$-$66$ cm$^2$ (area of stop pedestal 4). For preliminary choice in design, take $IN_q=1950\times1.5\times2\approx35{,}000$ (AT), $J_q\approx45$ A/mm$^2$. The brake electromagnet having these characteristics during operation at 380 v has a working stroke (namely rated working air gap) not less than 12 mm. While operating on 220 v, its working stroke is not less than 6 mm. Within the variation range of 220 v-380 v, the holding current is allowed to change naturally as the voltage varies. In order to permit the attracting force or maximum working stroke to vary and to enhance the reliability of the device, the coil may be divided into 2-5 units; each having its own rectifying device and cutout, and the switching link and current-limiting link may also be divided accordingly. All control circuits shown in FIG. 1 to FIG. 5 are applicable. If the capacity of the contacts of the $J_1$ relay used for closing switching is insufficient, closing switching may be effected by means of an auxiliary relay of large capacity or a contact or with the aid of $J_1$. As to large and medium type of brakes requiring F>500 kgf to drive, except the use of single brake electromagnet for driving, two units of F/2 mounted in parallel on one brake may be used to effect a parallel driving.

The brake electromagnet of the present invention is light in weight. It can endure frequent operation (operation frequency may reach 1200 to 3600 (strokes) per hour as required), and sustain holding for hours or days. It can endure different weather conditions (i.e., snow) and can work in dust and high temperature environments. It can replace not only various brake electromagnets now available but also electromagnetic-hydraulic devices and electrohydraulic devices equipped in overhead cranes and other hoist equipment. As compared with $MZD_1$-200, the brake electromagnet of the present invention with the same capacity weighs less than 2.8 kg. Its weight economy index has been raised 6-8 times and its mechanical life can reach 5-10 million operations.

A further embodiment of the present invention is shown in FIG. 2. It is a direct acting type contactor with double break contacts according to the present invention which adopts the T-shaped solenoidal electromagnet for driving. Structurally, the bottom of insulation base plate DP for fixed static contact system stretches out downward a pair of supporting pads CT. The static core butts against CT through an upper (buffer) rubber pad SD and is fitted under DP through a lower (buffer) rubber pad XD, a bottom cover DG and a set of long studs CL. In order to enhance better protection for the electromagnet, particularly when made of silicon steel sheets, the bottom of DP stretches out downward another rectangular-shaped thin wall chamber QS. The control circuit device may also be fitted inside QS. No heat dissipating window is required on QS. The T-shaped moving core is fitted under an insulation support ZJ of moving contacts by means of fasteners. The mounting holes AZ for the contactor are located on DP. In FIG. 10, BB is the thin wall of chamber QS and MH is the arc suppressing hood.

The control circuits shown in FIG. 1-FIG. 5 are all applicable. In order to improve the function of arc suppression, the current-limiting link may be a miniature air pump motor for arc-blowing (as to other type of electromagnet or contactor, the current-limiting link may be just a cooling fan). The running current of the motor matches the holding current of the electromagnet.

The main contact separation of this model of contactor may be increased to 0.1-1 times compared to conventional products. This measure is helpful in developing new equipment of higher voltage grade and larger current capacity. The technique may also be used to enhance the technical economical indexes of certain types of electromagnetic relay.

In electromagnetic design, hot-rolled silicon steel sheet or low carbon steel is chosen to make the cores. The working magnetic flux-density of magnet poles in the holding state is taken as B=10-12.5 kilogauss; area of the upper pole 2 is $S_1=12.5$ F/B (cm$^2$); area of the stop pedestal 4 is $S_2=S_1+\Delta S_1$ where $\Delta S$ is the area occupied by the lower guiding bush 9 and the lower guiding rod 8. Since a contactor is a frequently operated electric apparatus, similar to embodiment 2, $J_q$ is taken as 40-60 A/mm$^2$. The attracting ampere-turns of electromagnet per millimeter of working stroke is INc=14-00-1700 (AT). The maximum starting ampere-turns of coil in cold state is calculated from INq=INc (0.85-3)$\delta$, where $\delta$ is the working stroke of electromagnet. Since the initial reactive force is small, the coefficients in brackets are taken lower in comparison with those of embodiment 1.

The electromagnet of the present invention, besides the distinguishing features described above, also possesses the merits of high weight economy index (from more than ten percent to over twenty times higher than that of present products), conserving the amount of copper, iron and energy used. It also has long mechanical life, good protection aspects and a wide field of application. It not only can carry out frequent operation but also can sustain holding on continuous duty and is capable of operating in a wide voltage range with either an A.C. source or D.C. source. In short, it can promote a new generation of products including contactors, traction electromagnets, and brake electromagnets etc.

I claim:

1. An electromagnet comprising:

a static core;

a coil assembly disposed within said static core, wherein when said coil assembly is in a cold state, a steady state starting ampere-turns of said coil is 1.5 to 5 times a minimum value necessary to achieve a closing movement of said electromagnet;

a moving core slidingly disposed within said coil assembly and said static core, said moving core including a horizontal portion and a vertical portion which join each other in a substantially T-shaped manner, wherein when said moving core starts a sliding motion within said coil assembly and said static core, a starting current density in said coil is selected within a range of 30 to 150 A/mm$_2$;

a first closing contacting surface disposed on said vertical portion and a second closing contacting surface disposed on said static core for contacting said first closing contacting surface; and a third closing contacting surface disposed on said horizontal portion and a fourth closing contacting surface disposed on said static core for contacting said third closing contacting surface, wherein, when said electromagnet is in a state of sustaining holding, a working magnetic flux-density on said first, second, third and fourth contacting surface is substantially the same as the value of a saturated magnetic flux density of said electromagnet.

2. The electromagnet of claim 1, wherein said electromagnet includes a material selected from the group of hot-rolled silicon steel sheet and low carbon steel.

3. The electromagnet of claim 2, wherein said working magnetic flux density on said first, second, third and fourth contacting surfaces is within a range of 10–14 kilogauss.

4. The electromagnet of claim 1, wherein said electromagnet is made of a soft magnetic material having a saturation value of 19–21 kilogauss and the working magnetic flux density is within a range of 15–18.5 kilogauss.

5. The electromagnet of claim 1, wherein said electromagnet is implemented in a brake electromagnet.

6. The electromagnet of claim 1, wherein said electromagnet is implemented in a direct acting type contactor.

7. The electromagnet of claim 1, wherein said electromagnet is implemented in an electromagnetic valve.

8. The electromagnet of claim 1, wherein said electromagnet is a direct acting type electromagnetic contactor having a current greater than 40 amps and does not include a metal seat and heat-dissipating window, said electromagnet further comprising:

an arc-suppressing hood operatively coupled to said moving core;

an insulating support coupled to said moving core;

an insulation base plate coupled to said static core; and fitting means for mounting said electromagnet on a first support surface, said fitting means operatively coupled to said insulation base plate and including a buffer part selected from the group of a rubber body or a spring.

9. An electromagnet comprising:

a static core;

a coil assembly disposed within said static core, wherein when said coil assembly is in a cold state, a steady state starting ampere-turns of said coil is 1.5 to 5 times a minimum value necessary to achieve a closing movement of said electromagnet;

a moving core slidingly disposed within said coil assembly and said static core, said moving core including a horizontal portion and a vertical portion which join each other in a substantially T-shaped manner, wherein when said moving core starts a sliding motion within said coil assembly and said static core, a starting current density in said coil is selected within a range of 30 to 150 A/mm$^2$;

a first closing contacting surface disposed on said vertical portion and a second closing contacting surface disposed on said static core for contacting said first closing contacting surface;

a third closing contacting surface disposed on said horizontal portion and a fourth closing contacting surface disposed on said static core for contacting said third closing contacting surface.

wherein, when said electromagnet is in a state of sustaining holding, a working magnetic flux-density on said first, second, third and fourth contacting surfaces is substantially the same as the value of a saturated magnetic flux density of said electromagnet; and a control circuit for controlling operation of said electromagnet including fuse means for protecting said coil.

10. The electromagnet of claim 9, wherein a current value of said fuse means is selected within a range of 1/6 to 1/2.75 the maximum starting current of the coil.

11. The electromagnet of claim 9, wherein said control circuit further comprises a shift-switching circuit and a current limiting circuit.

12. The electromagnet of claim 9, wherein said control circuit is an A.C. control circuit, said control circuit further comprising a current integral delayed switch and a current limiting circuit.

13. The electromagnet of claim 9, wherein said control circuit is a D.C. control circuit, said control circuit further comprising a time switching circuit and a chopped current limiting circuit.

14. The electromagnet of claim 9, wherein said control circuit is a D.C. control circuit, said control circuit further comprising a time delay switching circuit and a chopped current limiting circuit.

15. The electromagnet of claim 9, wherein said control circuit is a contactless control circuit, said control circuit further comprising a current limiting circuit and a time delayed switching circuit.

16. The electromagnet of claim 9, wherein said control circuit is a self-vibrating control circuit, said control circuit further comprising a shift-switching circuit.

17. The electromagnet of claim 9, wherein said control circuit is a self-vibrating control circuit, said control circuit further comprising a current integral delayed switching circuit.

* * * * *